Nov. 4, 1952  J. P. BUTTERFIELD  2,616,687
SUSPENSION
Filed March 18, 1947   2 SHEETS—SHEET 1
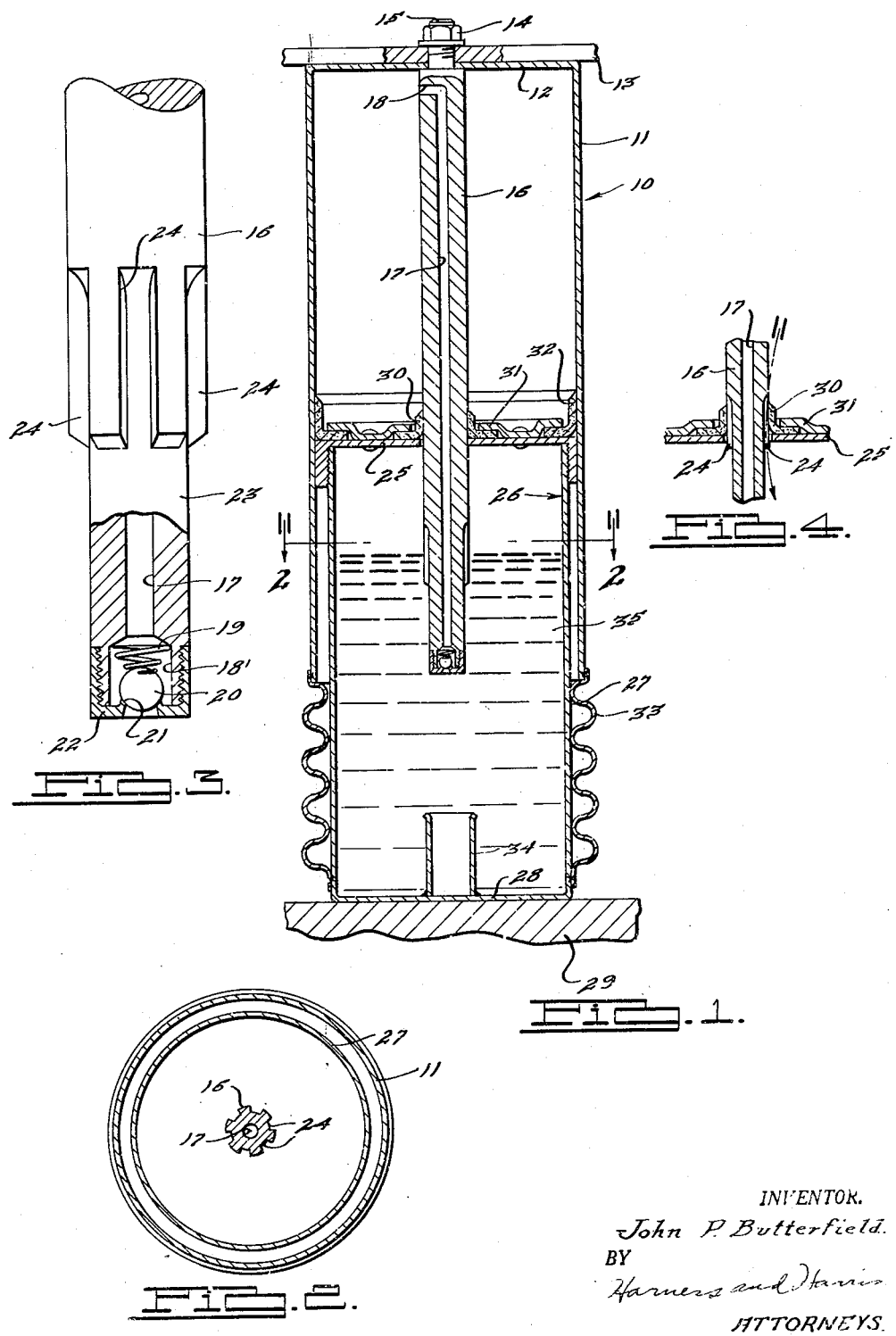
INVENTOR.
John P. Butterfield.
BY
Harness and Harris
ATTORNEYS.

Nov. 4, 1952  J. P. BUTTERFIELD  2,616,687
SUSPENSION

Filed March 18, 1947  2 SHEETS—SHEET 2

INVENTOR.
John P. Butterfield.
BY
Harness and Harris
ATTORNEYS.

Patented Nov. 4, 1952

2,616,687

UNITED STATES PATENT OFFICE 2,616,687

SUSPENSION

John P. Butterfield, Highland Park, Mich., assignor to Chrysler Corporation, Highland Park, Mich., a corporation of Delaware Application March 18, 1947, Serial No. 735,425

14 Claims. (Cl. 267—64)

This application relates to a vehicle suspension. More specifically it relates to an adjustable suspension comprising compressible and incompressible fluids such as air and a liquid.

In the case of a light car the passenger load may be a very appreciable fraction of the body weight, and so the ratio of heaviest total load to lightest total load on the car suspension is relatively high. Thus if the spring means are sufficiently soft for good riding at light load, the total deflection in the suspension may be so great that total vertical displacement of the car body will exceed permissible limits. I have made inventive discoveries whereby total deflection in a suspension may be kept relatively low without interference with desirable softness of the suspension.

An object of the present invention is to provide improvements in a spring to which compensating means are added reducing total deflection under wide variations in loading without interfering with requisite softness at all loads. The spring may be employed as part of a vehicle suspension.

A further object is to improve a spring employing compressible and uncompressible fluids.

Another object is to combine a shock absorber with a suspension employing compressible and uncompressible fluids.

Other objects will appear from the disclosure.

In the drawings:

Fig. 1 is a vertical section through one form of the improved suspension of the present invention;

Fig. 2 is a sectional view taken on the line 2—2 of Fig. 1;

Fig. 3 is an enlarged view partially in section of one end of a valve rod employed in the suspension of Fig. 1;

Fig. 4 is a sectional view of a portion of the suspension of Fig. 1, with the parts shown being in different position;

Figure 5:
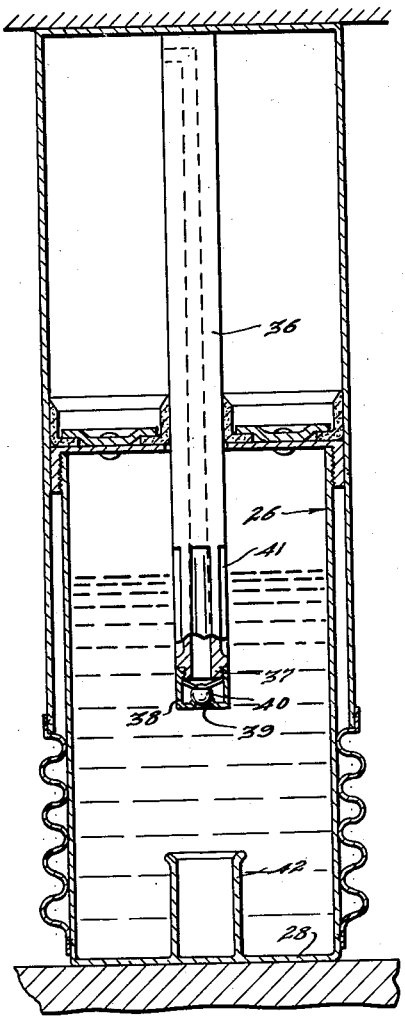
Fig. 5 is a longitudinal sectional view of a second form of suspension.

A hollow member 10 comprises a tubular wall 11 and a transverse end wall 12. The hollow member 10 is secured to a body-connected member 13 by means of a nut 14 and a reduced threaded end 15 on a valve rod 16 having a bore 17 and an outlet 18 adjacent the end wall 12. The bore 17 is enlarged at the lower end of the valve rod 16 as indicated at 18', and carries in the enlarged portion a spring 19 and a ball valve 20, which rests against a seat 21 formed on a cup 22 having threaded engagement with the lower end of the valve rod 16. The lower end of the valve rod 16 is reduced as indicated at 23 and the immediately adjacent larger portion of the valve rod has a plurality of longitudinal grooves 24.

The valve rod 16 projects through an opening formed in a cap 25, which has threaded engagement with a hollow member 26. The hollow member 26 has a tubular wall 27 and a transverse end wall 28 suitably secured to a wheel-connected member 29. The cap 25 closes the hollow member 26 and may be considered to provide another transverse end wall for the hollow member. A seal 30 closely embraces the valve rod 16 and is clamped to the cap 25 by a retainer 31 riveted to the cap. The retainer 31 also holds a sealing ring 32 against the cap 25. The ring 32 fits closely within the cylindrical wall 11 of the hollow member 10. An expansible-collapsible element 33 is secured at its ends to the hollow members 10 and 26 so as to seal the space between the cylindrical walls 11 and 27 of these hollow members. A short tubular section 34 is secured to the transverse end wall 28 of the hollow member 26 and has an inner diameter equal to the diameter of the reduced portion 23 of the valve rod 16.

Assume that the unit shown in Fig. 1 is included in a vehicle as a portion of the suspension between the body and wheel. When the load on the body is relatively light the parts of the unit will occupy the relative positions shown in Fig. 1. The space enclosed by the hollow member 10 and the cap 25 on the hollow member 26 is filled with air acting as a spring under compression. The hollow member 10 and the valve rod may have a certain amount of reciprocal movement due to road or ground irregularities. As the load on the body is increased, the valve rod 16 and the hollow member 10 move downwardly, the air spring above the cap 25 being compressed to a greater extent. When the load becomes sufficiently great, the reduced end 23 of the valve rod 16 will enter the short tubular section 34. When this happens, continued downward movement of the pin 23 of the tubular section 34 will cause the portion of an incompressible fluid 35 filling the hollow member 26, trapped in the tubular section 34 to raise the ball valve from its seat 21. Thereby a portion of the incompressible fluid 35 enters the bore 17 of the valve rod 16. When the rod 16 rises, the ball valve returns to the seat 21, thereby preventing escape of the incompressible fluid from the valve rod 16. An extended reciprocation of the reduced end 23 of the valve rod 16 within the tubular section 34 will repeatedly trap incompressible fluid in the bore 17, and eventually the quantity of this fluid may become sufficient to reach the top of the bore 17 and flow down to the top of the cap 25. The introduction of the incompressible fluid in the bore 17 of the valve rod 16 and in the hollow member 10 reduces the space that the trap-compressed air serving as a spring may occupy. Thus with each reciprocation of the reduced end 23 within the tubular section 34 the available space for compressed air is reduced to the extent that incompressible fluid is pumped into the valve rod 16. The result is that the hollow member 11 and the body-connected member 13 are raised with respect to the hollow member 26 in the wheel-connected member 29. Eventually the raising continues to the point where the reduced end 23 of the valve rod 16 no longer enters the tubular section 34, so the pumping and the raising stop. When now the relatively heavy load is removed from the body, the hollow member 10 and valve rod 16 rise still further to the point where the grooves 24 in the valve rod 16 are in the seal 30 as shown in Fig. 4. Thus the incompressible fluid collected in the hollow member 10 above the cap 25 may escape back to the hollow member 26. The condition wherein the valve rod 16 reaches the seal, as shown in Fig. 4, may take place not only as the result of sufficient lightening of load, but also as the result of reciprocation such as bouncing or jouncing from road irregularities superimposed on lightening of load.

The suspension unit of Fig. 5 is generally like that of Fig. 1 and differs therfrom in that a valve rod 36 has a uniform diameter throughout its length except for a short reduced threaded extremity to which a cup 38 having a seat 39 for a ball valve 40, is attached. Longitudinal grooves 41 are formed in the valve rod 36 and do not, as in Fig. 1, terminate in open ends at a reduced portion. A short tubular section 42 having an inner diameter equal to that of the valve rod and the cup 38 for trapping incompressible fluid is attached to the bottom end wall 28 of the hollow member 26. The unit of Fig. 5 functions in the same way as the unit of Fig. 1.

Figure 6:
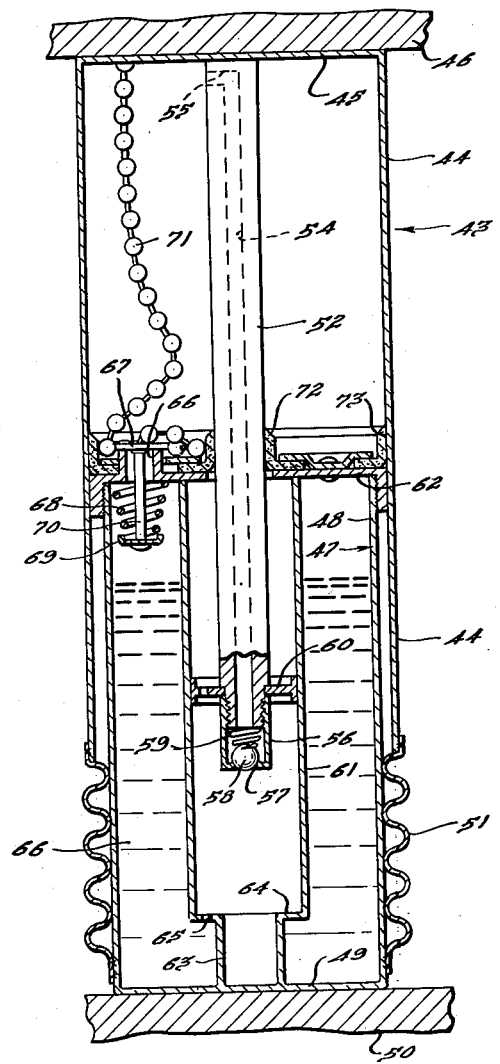
Fig. 6 is a sectional view of a third form of suspension.

The modified unit of Fig. 6 comprises a hollow member 43 having a tubular side wall 44 and an end wall 45 suitably secured to a body member or a body-connected member 46. A hollow member 47 has a tubular side wall 48 and an end wall 49 suitably secured to a wheel-connected member 50. An expansible collapsible element 51 is secured to the tubular side walls 48 and 44 so as to seal the space between them. A valve rod 52 is suitably secured to the end wall 45 within the hollow member 43 and has an axial bore 54 having an outlet 55 adjacent the end wall 45. The lower end of the valve rod 52 is reduced and threaded. A cup 56 having a valve seat 57 has threaded engagement with the reduced end of the valve rod 52. A ball valve 58 is held against the seat 57 by means of a coil spring 59 engaging the very end of the valve rod 52. A piston 60, which may be apertured or valved is clamped between the shoulder on the valve rod 52 and the cup 56. The piston 60 has sliding engagement with a cylinder 61 which is suitably secured to the end wall 49 of the hollow member 47 and a cap 62 having threaded engagement with the hollow member 47 so as to close the same. The cylinder 61 has a reduced lower end portion 63 having an inner diameter equal to the diameter of the cup 56. A shoulder portion 64 connecting the reduced portion 63 with the main body of the cylinder 61 has one or more appropriate apertures 65, which permit passage of incompressible fluid 66 in and out of the cylinder 61.

The cap 62 has a raised seat 66 engaged by a valve 67. The valve 67 is held against the seat 66 by a coil spring 68 acting against the under side of the cap 62 and a retainer 69 on a stem 70 attached to the valve 67. A ball chain 71 is attached at one end to the valve 67 and at the other end to an end wall 45 of the hollow member 43.

The operation of the unit of Fig. 6 is generally the same as that of the units of Figs. 1 and 5. When the load on the vehicle is sufficent to bring the body-connected member 46 toward the wheel-connected member 50 to the extent that the cup 56 enters the reduced portion 63 of the cylinder 61, irregularities in the ground over which the vehicle travels will cause the cup 56 to reciprocate within the reduced portion 63 of the cylinder 61. Thus the incompressible fluid trapped in the reduced portion 63 below the cup 56 will be admitted to the bore 54 with each downward motion of the valve rod 52 through raising of the ball valve 58 from its seat 57. Each upward movement of the valve rod 52 returns the ball valve 58 to the seat 57 preventing escape of the incompressible fluid trapped in the valve rod. Sufficient reciprocation of the cup 56 within the reduced portion 63 pumps sufficient fluid into the valve rod 52 that the incompressible fluid eventually flows from the outlet 55 in the valve rod 52 down to the top of the cap 62. When the amount of fluid pumped into the valve rod 52 is increased sufficiently, the valve rod will rise to the point where it no longer enters the reduced portion 63 of the cylinder 61, and the pumping action stops. When the load of the body-connected member 46 on the wheel-connected member 50 is sufficiently reduced, the end wall 45 of the hollow member 43 rises sufficiently under the action of the compressed gas trapped between the hollow member 43 and the cover 62 to the point where the ball chain 71 is pulled tight and lifts the valve 67 from the seat 66. Thereby the fluid on top of the cover 62 may return to the hollow member 47, and the hollow member 44 is lowered to the position of Fig. 6. It will be seen that the modified unit of Fig. 6 differs from those of Figures 1 and 5 by the use of the valve 67 and the ball chain 71 which provide for escape of the incompressible fluid from the hollow member 43 to the hollow member 47. The unit of Fig. 6 is also different in that the piston 60 is associated with the valve rod 52. This piston 60 and the cylinder 61 in which the piston slides serves as a shock absorber for the modified suspension unit of Fig. 6. As the valve rod 52 moves up or down, the piston 60 slides within the cylinder 61, and the incompressible fluid flows through the apertures or valve openings in the piston, and an appropriate shock absorber action is provided. For example, the valves in the piston may be so arranged that there is less resistance to downward movement of the piston in the valve rod 52 than to upward movement. The apertures or valve openings 65 provide for the necessary escape of fluids from the cylinder 61 due to reduction of available volume for fluid within the cylinder 61 due to descent of the piston 60 and valve rod 52 in the cylinder 61. The cap 62 on the hollow member 47 carries two seals 72 and 73, one acting against the valve rod 52 and the other acting against the tubular wall 44 of the hollow member 43.

It will be appreciated that for each of the three modifications described there will always be incompressible fluid trapped in the valve rod up to the level of the outlet near the upper end all and on the top of the cap 62 to the extent that, for example, fluid cannot drain through the grooves 24 below the level of the seal 30 of Figs. 1 and 4 and below the level of the raised seat 66 of Fig. 6.

I claim:

1. An adjustable suspension comprising a first cylinder closed at one end, a member secured at one end to the closed end of the first cylinder so as to extend therewithin and having an axial passage extending from the other end of the member to a side outlet in the member adjacent the said one end, a valve mounted in the passage adjacent the said other end, a second closed cylinder closely fitting the first cylinder and maintaining in an opening at one end, thereof a continual sliding reception of the member intermediate its said ends marking the origination and termination of the axial passage thereof, a liquid in the second cylinder, and a third cylinder mounted within the second cylinder on the other end thereof slidably to receive the said other end of the member for opening the valve therein, whereby successive movements of the member into the third cylinder produce successive openings of the valve in the member causing fluid to be pumped from the second cylinder through the passage in the member into the first cylinder, and in combination therewith mechanically actuated, two-way valve means comprising valving parts effective at said one end of the second closed cylinder to open the same to the pumped fluid in the first cylinder, at least one of said valving parts being mechanically connected for coordinated movement with said member whereby successive movements of the member produce successive openings of the valve means openly admitting fluid therethrough into the second closed cylinder.

2. An adjustable suspension comprising a first hollow member having a tubular wall and a transverse wall spaced from one end of the tubular wall, a rod attached at one end to the transverse wall and having an axial passage leading from its other end to a side outlet adjacent the said one end, a valve mounted in the passage adjacent the said other end, a reservoir comprising a second hollow member formed of a tubular wall closely fitting within the tubular wall of the first hollow member and first and second spaced transverse walls, the first transverse wall including guide means comprising guide-opening providing structure for maintaining a close operative fit about the periphery of portions of the rod traversed by said axial passage, liquid in the second hollow reservoir member, a tubular part secured to the second transverse wall within the second hollow member and slidably receiving the said other end of the rod in a close fit upon sufficient movement of the rod toward the second transverse member, whereby reciprocal movement of the rod within the tubular part will open the valve in the rod repeatedly so as to pump the liquid from the second hollow reservoir member through the passage in the rod to the first hollow member and two-way valving formed in the first transverse wall, of a pair of cooperating valve parts at least one of which is connected for movement with the first hollow member and rod to open the valving suitably in response thereto permitting liquid to bypass the passage in the rod and flow freely through the first transverse wall to the second hollow reservoir member from the first hollow member to empty the latter substantially of liquid.

3. The suspension specified in claim 2 wherein the said two-way valving has connecting means effective to connect the said one valve part with the first hollow member in the manner there described, in which the said connecting means comprises a flexible tension element connected to the said one valve part and to the transverse wall in the first hollow member and being responsive when extended to full effective length due to predetermined movement of the transverse wall of the first hollow member away from the first transverse wall for opening the said valving to provide for return of the liquid from the first hollow member to the second hollow member.

4. An adjustable suspension comprising a first hollow member having a tubular wall and a transverse wall spaced from one end of the tubular wall, a rod attached at one end to the transverse wall and having an axial passage leading from its other end to a side outlet adjacent the said one end, a valve mounted in the passage adjacent the said other end, a second hollow member formed of a tubular wall closely fitting within the tubular wall of the first hollow member and first and second spaced transverse walls, the first transverse wall including guide means comprising a guide opening providing structure for maintaining a close operative fit about the periphery of a portion of the rod traversed by said axial passage, liquid in the second hollow member, a tubular part secured to the second transverse wall within the second hollow member and slidably receiving the said other end of the rod in a close fit upon sufficient movement of the rod toward the second transverse member, whereby reciprocal movement of the rod within the tubular part will open the valve in the rod repeatedly so as to pump the fluid from the second hollow member through the passage in the rod to the first hollow member, and valving means incorporating at least one valving part formed on the rod adjacent its said other end and operative upon sufficient movement of the rod away from the tubular part to provide for return of the liquid from the first hollow member to the second hollow member.

5. An adjustable suspension comprising a first hollow member having a tubular wall and a transverse wall spaced from one end of the tubular wall, a rod attached at one end to the transverse wall and having an axial passage leading from its other end to a side outlet adjacent the said one end, a valve mounted in the passage adjacent the said other end, a second hollow member formed of a tubular wall closely fitting within the tubular wall of the first hollow member and first and second spaced transverse walls, the first transverse wall including guide means comprising a guide opening providing structure for maintaining a close operative fit about the periphery of a portion of the rod traversed by said axial passage, liquid in the second hollow member, a tubular part secured to the second transverse wall within the second hollow member and slidably receiving the said other end of the rod in a close fit upon sufficient movement of the rod toward the second transverse member, whereby reciprocal movement of the rod within the tubular part will open the valve in the rod repeatedly so as to pump the fluid from the second hollow member through the passage in the rod to the first hollow member, and grooves formed on the rod adjacent its said other end and operative upon sufficient movement of the rod away from the tubular part to reach the guide means of the first transverse wall of the second hollow member thereby to provide for return of the liquid from the first hollow member to the second hollow member.

6. In a vehicle, a body-connected member and a wheel-connected member movably cooperating with one another to enclose a space for compressible fluid decreasing and increasing in size, respectively, with increase and decrease in body load, incompressible fluid in the wheel-connected member, a valve-controlled conduit attached to the body-connected member and projecting through an upper wall of a pair of vertically spaced walls of the wheel-connected member, a part mounted in the lower wall of the wheel-connected member and facing upwardly and engageable with the conduit so as to cooperate therewith in pumping incompressible fluid from the wheel-connected member into the space between the members, a valve mounted on the said wall of the wheel-connected member, and valve actuating means connected to the valve and to the body-connected member so as to cause the valve to pass incompressible fluid from the space between the members to the wheel-connected member in response to relative movement to the body-connected member causing increase of the space to a comparatively large value.

7. In a vehicle, a body-connected member and a wheel-connected member movably cooperating with one another to enclose a space for compressible fluid decreasing and increasing in size, respectively, with increase and decrease in body load, incompressible fluid in the wheel-connected member, and a valve-controlled conduit attached to the body-connected member and projecting through a wall of the wheel-connected member, a part mounted in the wheel-connected member and engageable with the conduit so as to cooperate therewith in pumping incompressible fluid from the wheel-connected member into the space between the members, the exterior of the conduit being provided with grooves at a certain region for passing incompressible fluid from the space between the members to the wheel-connected member upon increase of the space between the members sufficient to bring the groove on the conduit to intersection with the said wall of the wheel-connected member.

8. In a vehicle, a body-connected member and a wheel-connected member movably cooperating with one another to enclose a space for compressible fluid decreasing and increasing in size, respectively, with increase and decrease in body load, incompressible fluid in one member, a valve-controlled conduit structure attached to the other member and projecting into said one member, means carried by the conduit structure and presenting pumping surfaces, a part mounted in the said one member and engageable with the pumping surfaces of the means carried by the conduit so as to cooperate therewith in pumping incompressible fluid from the said one member into the space between the members in response to relative reciprocal movement between the members when the space therebetween is comparatively small, a transverse partition mounted to said one member in disposition between the space and incompressible fluid and slidably receiving the conduit structure as a guideway during the pumping reciprocation, and a valve effective between the space and incompressible fluid having a fixed part fixed to the partition and a movable part connected to the said other member.

9. In a vehicle, a body-connected member and a wheel-connected member movably cooperating with one another to enclose a space for compressible fluid decreasing and increasing in size, respectively, with increase and decrease in body load, incompressible fluid in one member, and a valve-controlled conduit attached to the other member and projecting through a wall of the said one member, a part mounted in the said one member and engageable with the conduit so as to cooperate therewith in pumping incompressible fluid from the said one member into the space between the members, the exterior of the conduit being provided with grooves at a certain region for passing incompressible fluid from the space between the members to the said one member upon increase of the space between the members sufficient to bring the grooves on the conduit to intersection with the said wall of the said one member.

10. In a suspension, a first hollow member having a tubular wall and a transverse wall spaced from an open end, a second hollow member slidably mounted in the first hollow member and having spaced inner and outer tubular walls and first and second end walls, one end wall cooperating with the walls of the first member to enclose a space for compressible fluid, a rod conduit attached to the end wall of the first hollow member and projecting within the first hollow member through the first end wall of the second hollow member into the space within the inner tubular wall of the second hollow member, the rod conduit having an outlet into the first hollow member at a region adjacent the end wall thereof, a valve in the rod conduit at its end in the inner tubular member, an apertured piston attached to the rod conduit at a region slightly spaced from said last mentioned end thereof and slidably engaging the inner tubular wall of the second hollow member, incompressible fluid in the second hollow member, the inner tubular wall having a reduced section at the second end wall adapted slidably to receive the said end of the rod conduit upon sufficient movement of rod conduit toward the second end wall of the second hollow member, whereby reciprocation of the said end of the rod conduit while in engagement with the reduced section of the inner wall causes incompressible fluid to be pumped through the rod conduit and the valve therein into the first hollow member, a valve in the first end wall of the second hollow member, and means connecting the last mentioned valve and the first hollow member for causing sufficient movement of the end wall of the first hollow member away from the first end wall of the second hollow member to open the last mentioned valve and thereby to provide for return of the incompressible fluid from the first hollow member to the second hollow member.

11. In a suspension, the combination with a first hollow member provided with an opening at one end, a second hollow member telescopically received in the opening of the first hollow member for relative reciprocation and provided with liquid, a plunger connected interiorly of one of said members for coordinated reciprocal movement therewith relative to the other member, a dashpot and a pump cylinder each attached interiorly of the other member to a transverse wall of the same and being in communication with said quantity of liquid and facing toward said one member, and a piston cooperating in pumping reciprocation with said pump cylinder for transferring a quantity of the liquid from the second hollow member to the first hollow member, of a piston cooperating in damping reciprocation with said dashpot for displacing and replenishing a quantity of the liquid as between the dashpot and second hollow member, said pistons being operatively carried in tandem in response to the movements of the plunger.

12. In a suspension, the combination with a first hollow member provided with an opening at one end, a liquid occupying a portion of the hollow, a second hollow member telescopically received in the opening of the first member for relative reciprocation and comprising a wall portion serving to trap the liquid in the first member, transfer valve structure associated with the wall portion of the second member and comprising means forming a transfer passage and control valve means therefor, a dashpot disposed within a certain of said members and provided with damping fluid, and a piston for the dashpot, said dashpot and transfer passage means being each attached for movement with said certain member and said dashpot facing toward the other of said members, of tie means and plunger means for connecting the control valve means and piston respectively to the other of said members for appropriate movement therewith in respectively releasing the liquid from the first hollow member for transfer through the transfer passage and for affording damping resistance to movement as is encountered in reciprocatingly displacing said fluid.

13. In a vehicle, a body-connected member and a wheel-connected member movably cooperating with one another to enclose a space for compressible fluid decreasing and increasing in size, respectively, with increase and decrease in body load, one member comprising a reservoir member provided with incompressible fluid, a cup part completely submerged in the incompressible fluid and having a sealed end mounted to a first transverse wall of the reservoir member and having an open end in communication with the incompressible fluid and facing the other of said members, a valve-controlled conduit attached to the other member and having an end projecting into the reservoir member, a second transverse wall mounted in the reservoir member to separate the reserve incompressible fluid from the said enclosed space between members and having guide means providing a continuous operative fit about the conduit, said conduit having pumping surfaces on the said projecting end thereof cooperably receivable by the open ended cup part to pump incompressible fluid from the reservoir member into the space between members in response to relative reciprocal movement between the members when the space therebetween is comparatively small, and valving operative in the second transverse wall formed of a pair of cooperating valve parts at least one of which is connected for movement with the other member and conduit to open the valving upon increase of the space to a comparatively large size, by-passing the valve-controlled conduit and permitting free return of the incompressible fluid to the reservoir from the space between members.

14. An adjustable pneumatic spring device having a load-carrying supported part comprising a pressure cylinder closed at one end to store therein a quantity of compressible fluid under pressure, a member secured at one end to the closed end of the pressure cylinder so as to extend therewithin, and having an axial passage extending from the other end of the member to a side outlet in the member adjacent the said one end, a check valve mounted in the passage adjacent the said other end, a part supporting the supported part comprising a reservoir cylinder having an end closely fitting the pressure cylinder and maintaining a continual sliding reception of said member along the lengthwise exterior surfaces of the latter intermediate the said ends thereof, a body of incompressible fluid in the reservoir cylinder, a third cylinder located below the level of the incompressible fluid in the reservoir member, having a closed end mounted on the said other end of the reservoir member and an open end in communication with the body of incompressible fluid, said third cylinder slidably receiving through the open end thereof the said other end of the member for pumping quantities of incompressible fluid through the passage in the member due to successive openings of the check valve, thereby causing quantities of incompressible fluid to occupy space in said pressure cylinder and increase the resistance of the spring device to loads, and two-way mechanically actuated valving comprising a pair of parts effective at said one end of the reservoir cylinder to open the same and expose the remaining body of incompressible fluid to direct access of and rejoinder by pumped quantities of the same, at least one part of said pair of parts being mechanically connected for coordinated movement with said member in order positively to provide complete mechanical control over the two-way valving.

JOHN P. BUTTERFIELD.

REFERENCES CITED

The following references are of record in the file of this patent:

UNITED STATES PATENTS

| Number | Name | Date |
|---|---|---|
| 1,164,182 | Green | Dec. 14, 1915 |
| 1,291,016 | Kellogg | Jan. 14, 1919 |
| 1,454,905 | Poindexter | May 15, 1923 |
| 1,487,597 | Poindexter | Mar. 18, 1924 |
| 1,605,249 | Loyd | Nov. 2, 1926 |
| 1,640,896 | Holmes | Aug. 30, 1927 |
| 2,436,573 | Heynes | Feb. 24, 1948 |

FOREIGN PATENTS

| Number | Country | Date |
|---|---|---|
| 127,904 | Great Britain | June 19, 1919 |